Dec. 30, 1930.  A. H. WADELL  1,786,638
GAUGE FOR ADJUSTING BRAKE LININGS
Filed April 28, 1928
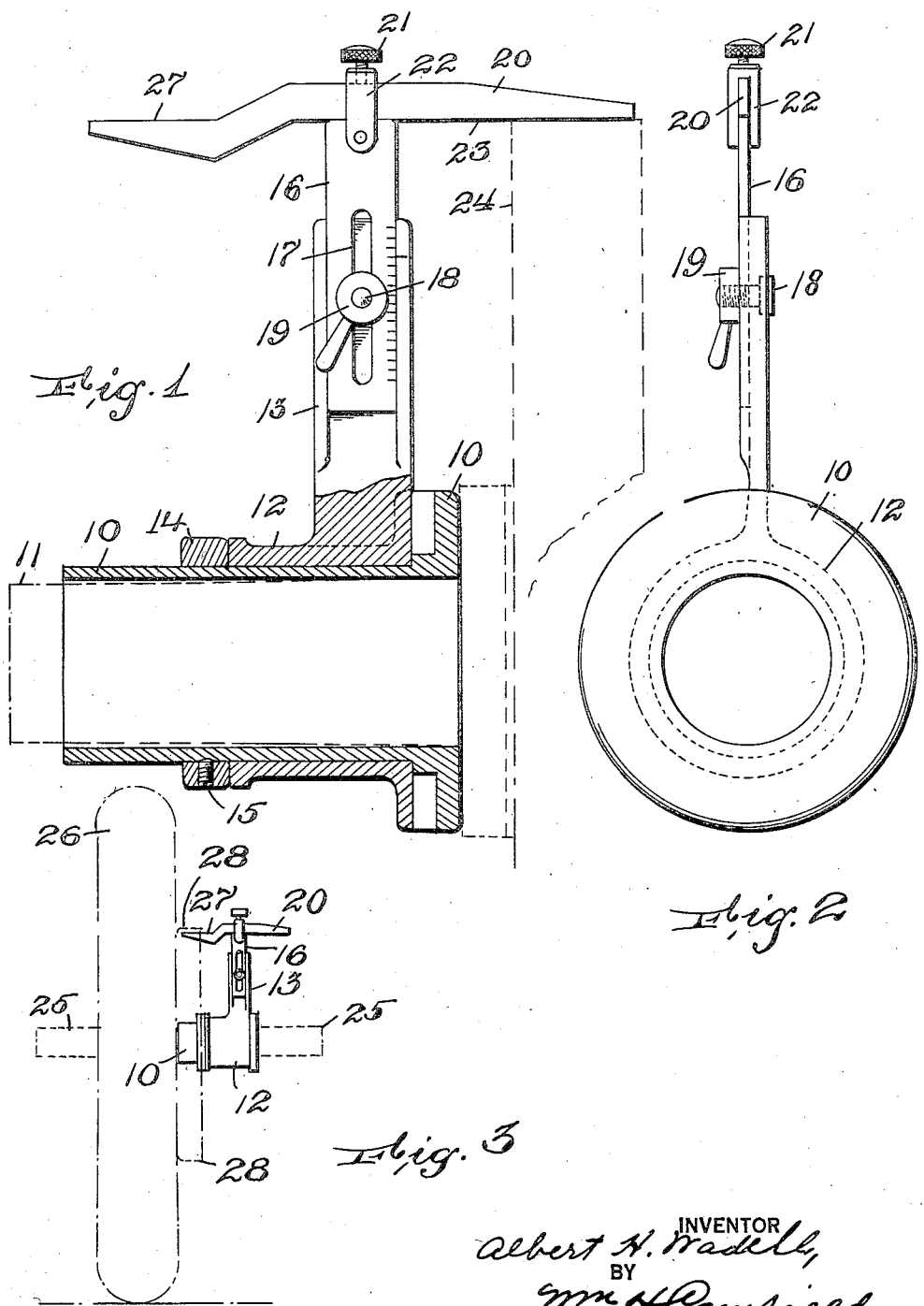
INVENTOR
Albert H. Wadell,
BY
Wm H Caufield,
ATTORNEY.

Patented Dec. 30, 1930

1,786,638

UNITED STATES PATENT OFFICE

ALBERT H. WADELL, OF NEWARK, NEW JERSEY

GAUGE FOR ADJUSTING BRAKE LININGS

Application filed April 28, 1928. Serial No. 273,448.

This invention relates to an improved gauge for adjusting brake linings in the type of brakes known as inside brakes as used on motor cars, in which brake the lining is supported on a band which is inside of a drum on the wheel. The brake, to be in proper order must have the lining arranged so that it bears equally on all points on the drum, in other words, must be in the form of a circle. In the inside brake the lining can not be seen on account of the encircling drum and the adjustment of the lining is therefore largely a matter of guess work.

This invention provides a gauge which is temporarily placed on the axle of the car and can be rotated in order to carry a gauge finger around the periphery of the brake lining to indicate any eccentricity and the band can be adjusted to make it concentric.

The gauge can also be mounted on a stud shaft placed in the bearing of the wheel and the gauge can be rotated inside of the drum to secure the exact size of the braking surface of the drum. The gauge can thus be used on the wheel to secure a setting of the gauge and then placed on the axle to adjust the lining to fit the drum since in this form the gauge finger has two gauging edges, one for the drum and one for the lining and they are substantially in line, the former on the outer edge on one side of the fixture and the latter on the inner edge on the other side of the fixture.

The invention is illustrated in the accompanying drawing in which Figure 1 is a section of the fixture with the brake lining and the axle indicated in dotted lines. Figure 2 is an end view of the gauge and Figure 3 is a small view showing how the gauge is placed on a wheel for the purpose of setting it by means of the drum for adjusting the lining for that drum.

The device comprises a fixture for temporary support on a shaft or axle, a rotatable arm and an element such as a finger for traversing the periphery of the brake lining.

In the form illustrated I show a hub 10 which is adapted to slide over the axle of an automobile. On the hub is arranged the bearing 12 of the arm 13. The bearing is freely rotatable and is held in place by such means as the collar 14 held by the screw 15. The arm 15 is provided with an extension 16 that is preferably adjustable. I show the slot 17 and the screw 18 with the nut 19 as a clamping means. The arm has a gauge finger of which one form is shown at 20 which projects from the arm 13 and is shown as held by the set screw 21 in the clamp 22. The bottom edge 23 of the finger 20 is thus in position to be used as a gauge for checking up all parts of the periphery of the brake lining 24 and the lining can be adjusted so that it is concentric and that all parts will contact equally within the inside of its brake drum.

The gauge can be set from the drum itself by placing it on a shaft 25 which is held in the opening or bearing in the wheel 26. The fixture is then adjusted so that the edge 27 of the finger 20 is in contact with the inside of the brake drum 28 on the wheel. When so adjusted the fixture is placed on the shaft 11 of the car and the brake lining adjusted as above described. The edge 27 is substantially in line with the edge 23 in order to adjust the lining to the size of the drum, as will be evident.

Various changes can be made without departing from the scope of the invention.

I claim:—

1. A gauge for adjusting brake linings comprising an arm, a hub for readily mounting the arm in order that it can rotate on an axle, an adjustable extension on the arm, and a finger secured to the extension, the finger having one end with a gauging edge at the bottom and having the other end with a gauging edge at the top, the two edges being substantially in line.

2. A gauge for adjusting brake linings comprising a barrel, a bearing rotatable on the barrel and having a radially projecting arm, an extension adjustable on the arm, a finger secured on the extension and projecting to one side to provide an edge for traversing the periphery of the brake lining and projecting to the other side to provide an edge for traversing the braking face of a brake drum when the device is reversed.

3. A gauge comprising an arm, means for readily attaching the arm rotatably on an axle, and a finger projecting to both sides of the arm, the finger having a gauging edge at the top on one side of the arm and a gauging edge at the bottom on the other side, said edges being substantially in line whereby the finger can be adjusted on a brake drum and subsequently used to gauge the lining for said drum.

In testimony whereof I affix my signature.

ALBERT H. WADELL.